(12) United States Patent
Wan

(10) Patent No.: US 10,846,514 B2
(45) Date of Patent: Nov. 24, 2020

(54) PROCESSING IMAGES FROM AN ELECTRONIC MIRROR

(71) Applicant: TENCENT TECHNOLOGY (SHENZHEN) COMPANY LIMITED, Shenzhen (CN)

(72) Inventor: Changxun Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 173 days.

(21) Appl. No.: 15/948,743

(22) Filed: Apr. 9, 2018

(65) Prior Publication Data
US 2018/0225505 A1 Aug. 9, 2018

Related U.S. Application Data

(63) Continuation of application No. PCT/CN2017/079414, filed on Apr. 5, 2017.

(30) Foreign Application Priority Data

Apr. 22, 2016 (CN) .......................... 2016 1 0257054

(51) Int. Cl.
*G06K 9/00* (2006.01)
*G06F 9/00* (2006.01)
(Continued)

(52) U.S. Cl.
CPC ......... *G06K 9/00255* (2013.01); *G06F 16/00* (2019.01); *G06F 16/583* (2019.01);
(Continued)

(58) Field of Classification Search
CPC ......... G06T 7/11; G06T 7/50; G06K 9/00248; G06K 9/00268; G06K 9/00295;
(Continued)

(56) References Cited

U.S. PATENT DOCUMENTS

2009/0060289 A1 3/2009 Shah et al.
2009/0207269 A1* 8/2009 Yoda ................. G06T 11/60
348/222.1
(Continued)

FOREIGN PATENT DOCUMENTS

CN 1825950 A 8/2006
CN 101425144 A 5/2009
(Continued)

OTHER PUBLICATIONS

International Search Report dated Jun. 26, 2017 in PCT/CN2017/079414 with English translation.
(Continued)

*Primary Examiner* — Kenny A Cese
(74) *Attorney, Agent, or Firm* — Oblon, McClelland, Maier & Neustadt, L.L.P.

(57) ABSTRACT

Aspects of the disclosure provide a method for processing an electronic mirror image. The method can include receiving a face-included image from an electronic mirror, and determining a face model that matches the face-included image. A user identity associated with the matched face model can then be obtained. A notification is sent to a terminal corresponding to the associated user identity. The notification indicates the face-included image has been obtained at the electronic mirror.

20 Claims, 11 Drawing Sheets

(51) Int. Cl.
*G06F 16/583* (2019.01)
*G06F 16/00* (2019.01)

(52) U.S. Cl.
CPC ..... *G06K 9/00228* (2013.01); *G06K 9/00275* (2013.01); *G06K 9/00281* (2013.01); *G06K 9/00295* (2013.01)

(58) Field of Classification Search
CPC ............. G06K 9/0255; G06K 9/00281; G06K 9/00228; G06K 9/00275; G06F 21/31; G06F 16/583; G06F 16/00; A61B 5/1176
See application file for complete search history.

(56) References Cited

U.S. PATENT DOCUMENTS

| | | | | |
|---|---|---|---|---|
| 2014/0198962 | A1* | 7/2014 | Anabuki | G06K 9/00369 382/128 |
| 2016/0063235 | A1* | 3/2016 | Tussy | G06K 9/00926 726/6 |
| 2016/0127710 | A1* | 5/2016 | Saban | G06T 11/00 386/241 |
| 2016/0255303 | A1* | 9/2016 | Tokui | G06T 3/20 348/14.01 |

FOREIGN PATENT DOCUMENTS

| | | |
|---|---|---|
| CN | 102067127 A | 5/2011 |
| CN | 102521619 A | 6/2012 |
| CN | 102724192 A | 10/2012 |
| CN | 103605928 A | 2/2014 |
| CN | 103945001 A | 7/2014 |
| CN | 104199542 A | 12/2014 |
| CN | 104572732 A | 4/2015 |
| CN | 105354334 A | 2/2016 |
| CN | 105956022 A | 9/2016 |

OTHER PUBLICATIONS

Chinese Office Action Issued in CN201610257054.5 dated Mar. 3, 2020, (13 pages).

* cited by examiner

PROCESSING IMAGES FROM AN ELECTRONIC MIRROR

RELATED APPLICATION

This application is a continuation of International Application No. PCT/CN2017/079414, filed on Apr. 5, 2017, which claims priority to Chinese Patent Application No. 201610257054.5, filed with the Chinese Patent Office on Apr. 22, 2016 and entitled "IMAGE PROCESSING METHOD FOR ELECTRONIC MIRROR AND IMAGE PROCESSING APPARATUS FOR ELECTRONIC MIRROR, AND IMAGE PROCESSING METHOD AND APPARATUS". The entire disclosures of the prior applications are hereby incorporated by reference in their entirety.

FIELD OF THE TECHNOLOGY

The present disclosure relates to the field of Internet technologies.

BACKGROUND OF THE DISCLOSURE

As commonly-seen daily use articles and commercial goods, mirrors are generally used in application scenarios relating to dressing or makeup of people, and are for example, dressing mirrors in a fitting room or makeup mirrors in a hair salon. However, currently, the function of a mirror is limited to a use scenario and generally can only be implemented at a particular geographical location, and the resources of mirrors are not fully used. For example, the dressing mirror in the fitting room is generally only used for presenting the dressing appearance of a user by means of light reflection when the user tries clothes on in the fitting room. Some mirrors further have functions for virtual dressing, but these functions can only be used when the user faces a mirror and cannot be used when the user is away from the mirror.

SUMMARY

Aspects of the disclosure provide a method for processing an electronic mirror image. The method can include receiving, at an information processing apparatus, a face-included image from an electronic mirror, and determining, by processing circuitry of the information processing apparatus, a face model that matches the face-included image. A user identity associated with the matched face model can then be obtained. A notification is sent to a terminal corresponding to the associated user identity. The notification indicates the face-included image has been obtained at the electronic mirror.

Aspects of the disclosure further provide a non-transitory computer-readable medium storing a program. The program is executable by a processor to receive from a server at an information processing apparatus a notification that an electronic mirror has collected a face-included image. The program is executable to further obtain and display the face-included image and an identifier of the electronic mirror according to the notification.

Aspects of the disclosure further provide an apparatus for processing an electronic mirror image. The apparatus can include processing circuitry configured to receive a face-included image from an electronic mirror, and determine a face model that matches the face-included image. The processing circuitry can further be configured to obtain a user identity associated with the matched face model, and send a notification to a terminal corresponding to the associated user identity. The notification indicates the face-included image has been obtained at the electronic mirror.

In some embodiments, after the face-included image collected by the electronic mirror is obtained, the face-included image can be automatically recognized to identify a user that is included in the face-included image. The face-included image is sent to the identified user. Thus, after the electronic mirror has collected the face-included image, the user can receive a corresponding notification on a user terminal. As a result, application scenarios of electronic mirrors are extended, and the resources of the electronic mirrors can be fully, conveniently, and easily used.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
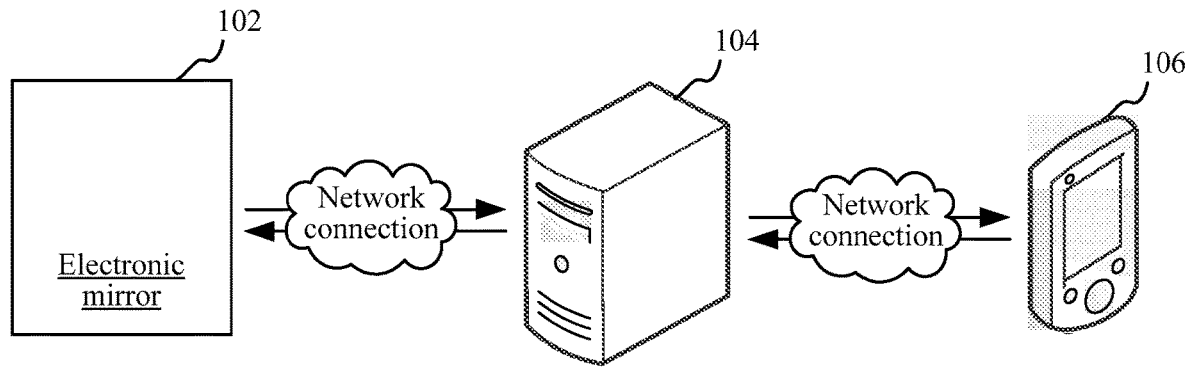
FIG. 1 is a diagram of an application environment of an electronic mirror interaction system according to some embodiments of this application.

As shown in FIG. 1, in some embodiments of this application, an electronic mirror interaction system is provided, including: an electronic mirror 102, an Internet-of-Things open platform 104, and a user terminal 106. The electronic mirror 102 and the user terminal 106 are connected to the Internet-of-Things open platform 104 by using a network. The Internet-of-Things open platform 104 includes one or more physical servers, provides an access service for the electronic mirror 102, and provides an interaction interface for the user terminal 106.

In some embodiments, the electronic mirror 102, also referred to as a smart mirror, further has a data processing capability and a capability of interacting with a user in addition to presenting an image of a person or an object in front of the mirror. For example, the electronic mirror 102 may receive operation instructions of a user, and collect an image of the user in front of a camera and send the image to the Internet-of-Things open platform for storage or processing.

In some embodiments, the Internet-of-Things open platform 104 is an open access platform, and an Internet-of-Things device (for example, the electronic mirror in the embodiments of this application) may access the Internet-of-Things open platform 104, to implement data storage and management thereof.

Figure 2:
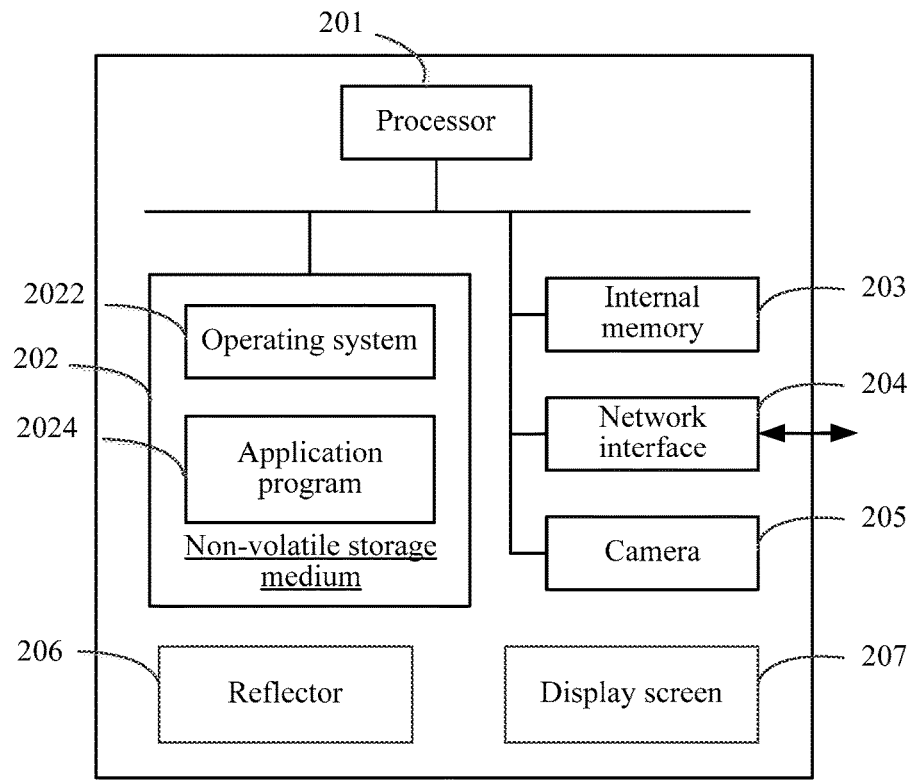
FIG. 2 is a schematic diagram of compositional structures of an electronic mirror according to some embodiments of this application.

As shown in FIG. 2, in some embodiments of this application, an electronic mirror 102 is provided, including processing circuitry such as a processor 201, a non-volatile storage medium 202, an internal memory 203, a network interface 204, and a camera 205 that are connected with each other by using a system bus, and further including at least one of a reflector 206 and a display screen 207. The processor 201 has a computing function and a function of controlling the working of the electronic mirror 102. The non-volatile storage medium 202 stores an operating system 2022 and an application program 2024. The internal memory 203 is configured to: cache data of an application program and cache intermediate data obtained by the processor by means of processing. The network interface 204 is configured to connect to the Internet-of-Things open platform 104 and interact with the Internet-of-Things open platform 104. The camera 205 is configured to collect an image. The reflector 206 is configured to present an image of a person or an object in front of the reflector by means of a light reflection principle. The display screen 207 may be configured to display an image collected in real time by the camera 205, to achieve an effect similar to that achieved by the reflector 206.

Figure 3:
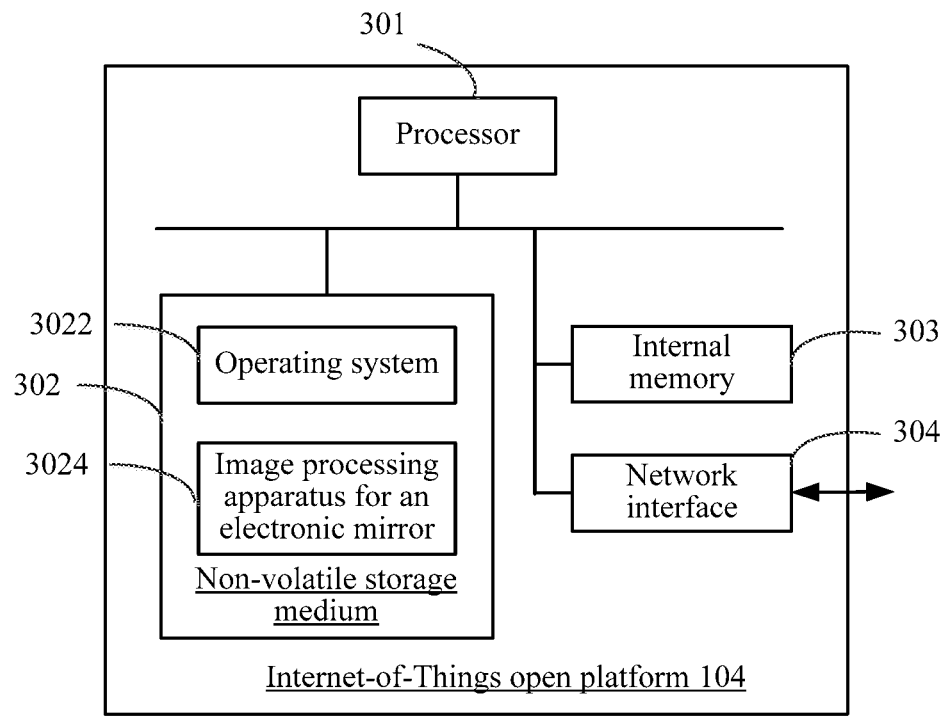
FIG. 3 is a schematic diagram of compositional structures of an Internet-of-Things open platform according to some embodiments of this application.

As shown in FIG. 3, in some embodiments of this application, an Internet-of-Things open platform 104 is provided, including processing circuitry such as a processor 301, a non-volatile storage medium 302, an internal memory 303, and a network interface 304 that are connected with each other by using a system bus. The processor 301 has a computing function and a function of controlling the working of the Internet-of-Things open platform 104. The processor 301 is configured to perform an image processing method for an electronic mirror. The non-volatile storage medium 302 includes a magnetic storage medium, an optical storage medium, or a flash storage medium. The non-volatile storage medium stores an operating system 3022 and an image processing apparatus for an electronic mirror 3024. The image processing apparatus for an electronic mirror is configured to implement an image processing method for an electronic mirror.

Figure 4:
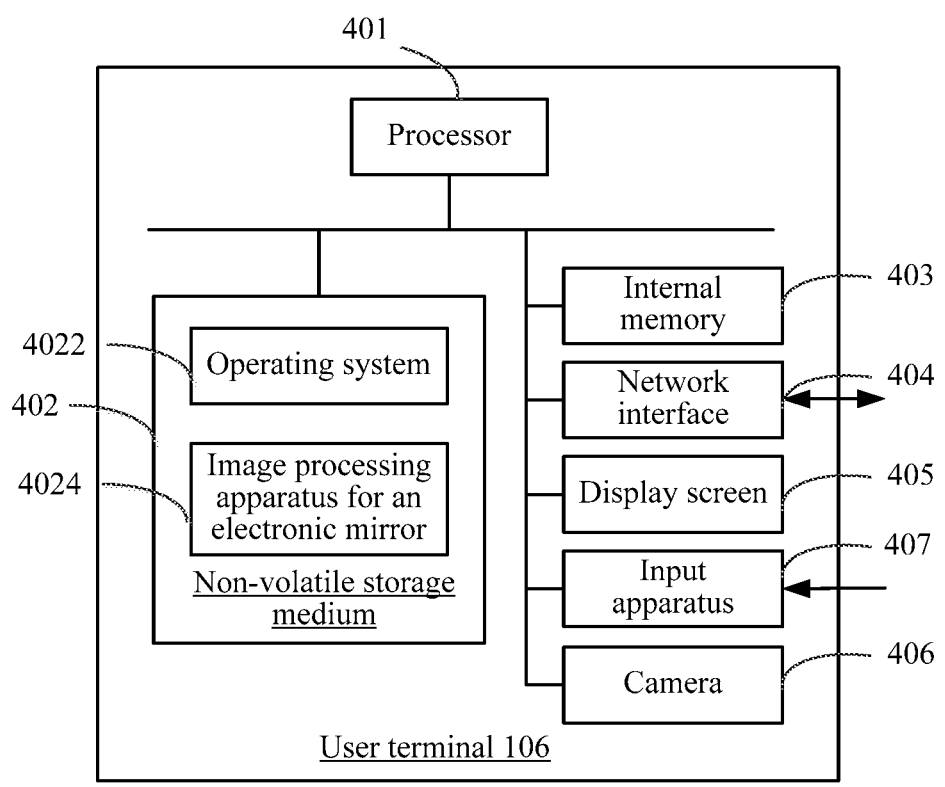
FIG. 4 is a schematic diagram of compositional structures of a user terminal according to some embodiments of this application.

As shown in FIG. 4, in some embodiments of this application, a user terminal 106 is provided, including processing circuitry such as a processor 401, a non-volatile storage medium 402, an internal memory 403, a network interface 404, a display screen 405, a camera 406, and an input apparatus 407 that are connected with each other by using a system bus. The processor 401 has a computing function and a function of controlling the working of the user terminal 106. The processor is configured to perform an image processing method. The non-volatile storage medium 402 includes a magnetic storage medium, an optical storage medium, or a flash storage medium. The non-volatile storage medium 402 stores an operating system 4022 and an image processing apparatus 4024 for an electronic mirror. The internal memory 403 is configured to provide high-speed caching for the operating system 4022 and the image processing apparatus 4024 for an electronic mirror. The display screen 405 may be a liquid crystal display screen or an electronic ink display screen. The input apparatus 407 may be a touchpad, a track ball, a mouse, and a touch layer overlapping the display screen, and the display screen 405 and the touch layer form a touchscreen. The network interface 404 is configured to connect to a network. The user terminal 104 includes a personal computer and a mobile terminal. The mobile terminal includes a mobile phone, a tablet computer, a personal digital assistant (PDA), an e-reader that can be connected to a network, and the like.

Figure 5:
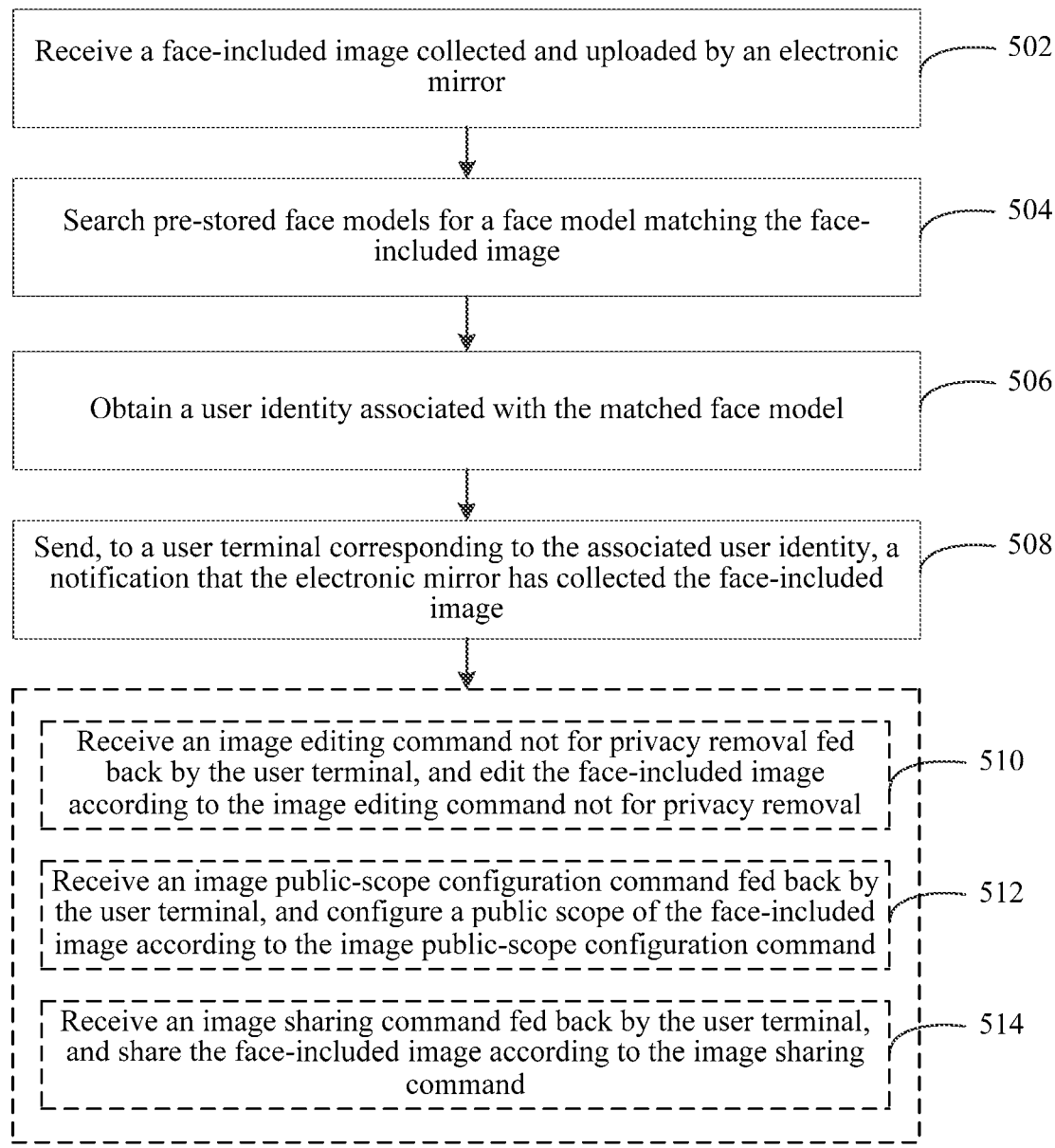
FIG. 5 is a schematic flowchart of an image processing method for an electronic mirror according to some embodiments of this application.

As shown in FIG. 5, in some embodiments of this application, an electronic mirror image processing method is provided. The embodiments are described by using an example in which the method is applied to the Internet-of-Things open platform 104 shown in FIG. 1 and FIG. 3. The method specifically includes the following steps:

Step 502: Receive a face-included image collected and uploaded by an electronic mirror.

The electronic mirror is a mirror, such as an electronic dressing mirror or an electronic makeup mirror, which can collect an image and can send the collected image by using a network. The face-included image is an image including at least one face. The face-included image may further include other parts of a human body. For example, the face-included image may be a half-length photo including a face or a full-length photo including a face. The electronic mirror may be configured as a public device, which can collect an image according to operation instructions of the public and provide the image for the Internet-of-Things open platform. However, a permission of reading data from the Internet-of-Things open platform or modifying data in the Internet-of-Things open platform may be limited.

The electronic mirror may obtain a control instruction of a user, so as to collect the face-included image according to the control instruction. The control instruction may be triggered in manners such as pressing a physical key, a touch control operation or sound control. The electronic mirror may also collect an image in real time and perform face detection on the collected image, and if detecting a face, upload the detected face to the Internet-of-Things open platform as the face-included image. The electronic mirror may also detect a specified body movement by using the image collected in real time, so as to collect the face-included image when detecting the specified body movement. The specified body movement is, for example, blinking eyes, opening and closing the mouth, raising a hand, or nodding the head.

In some embodiments of this application, the electronic mirror may further edit the collected face-included image and then upload the edited face-included image to the Internet-of-Things open platform. For example, the electronic mirror may provide various virtual dressing appearance options, select a virtual dressing appearance according to a user operation, and mix the selected virtual dressing appearance with the face-included image, so that the face-included image presents an effect that a person has the appearance of wearing a virtual dressing (e.g., virtual clothing).

Step 504: Search pre-stored face models for a face model matching the face-included image.

The face model is associated with a user identity, and is data used for describing facial features of a user corresponding to the user identity. The Internet-of-Things open platform may obtain in advance user face-included images corresponding to the user identity, extract features from the user face-included images to form face models, associate the face models with the user identity of the user to which the face model belongs, and store the face models. The user face-included image is an image including the face of a particular user. The extracted feature may be a texture feature, a shape feature, a bag-of-visual-words feature, or the like. The user face-included image may be selected from a network album of the user, or may be actively uploaded by the user after the user is notified, or may be pulled out from a third-party identity authentication platform.

In some embodiments of this application, the Internet-of-Things open platform may perform extraction on the face-included image to form a face model, calculate the similarity between the face model formed by means of extraction and each of the pre-stored face models, and then determine a face model having the highest similarity to be the face model matching the face-included image. The similarity may use the Euclidean distance or the Mahalanobis Distance.

In some embodiments of this application, if the similarity is lower than a preset minimum threshold, it is determined that no face model matching the face-included image is found. In this case, the face-included image may be directly deleted, or a permission of accessing the face-included image may be limited, or the electronic mirror is instructed to delete the corresponding face-included image stored in the electronic mirror, so that malicious obtaining of the face-included image can be avoided as much as possible when a user to which the face-included image belongs cannot be determined.

Step 506: Obtain a user identity associated with the matched face model.

Specifically, the Internet-of-Things open platform associates a user identity of a user with a face model of the user in advance. Each user identity may be associated with a plurality of face models of the same user. After determining the face model matching the face-included image, the Internet-of-Things open platform obtains the user identity that is associated with the face model matching the face-included image. The user identity is used for uniquely identifying the corresponding user and may include at least one of numbers, letters, and special symbols.

In some embodiments of this application, the Internet-of-Things open platform may perform training in advance according to face models associated with a preset known user identity to obtain a facial recognition model, and recognize the user identity corresponding to the face-included image by using the facial recognition model after receiving the face-included image. The facial recognition model may use an artificial neural network.

Step 508: Send, to a user terminal corresponding to the associated user identity, a notification that the electronic mirror has collected the face-included image.

Specifically, the Internet-of-Things open platform may obtain a network address of the user terminal corresponding to the associated user identity, so as to send a notification to the user terminal according to the network address. The network address may be reported by the user terminal according to successful login of the user identity. The notification carries an image identifier of the face-included image and recognition information of the electronic mirror, and may further carry the face-included image or a thumbnail of the face-included image.

By means of the image identifier, the face-included image or the thumbnail that are carried in the notification, it can be determined that the face-included image has been collected, and a specific electronic mirror that has collected the face-included image can be recognized by using the recognition information of the electronic mirror. The recognition information is used for recognizing a corresponding electronic mirror, and is, for example, the number, name, location information, and/or owner information of the electronic mirror.

In some embodiments of this application, there may be a plurality of faces in the face-included image, correspondingly, there may be a plurality of matched face models and a plurality of associated user identities, and there may be a plurality of user terminals that finally receive the face-included image.

According to the image processing method for an electronic mirror, after the face-included image collected by the electronic mirror is obtained, the face-included image can be automatically recognized to determine a user to which the face-included image belongs, so that the face-included image is sent to the corresponding user. The electronic mirror is no longer limited to a use scenario, and after the electronic mirror has collected the face-included image, the user can receive a corresponding notification by using a user terminal, so that application scenarios of the electronic mirror are extended, and the resources of the electronic mirror are fully, conveniently, and easily used.

Figure 6:
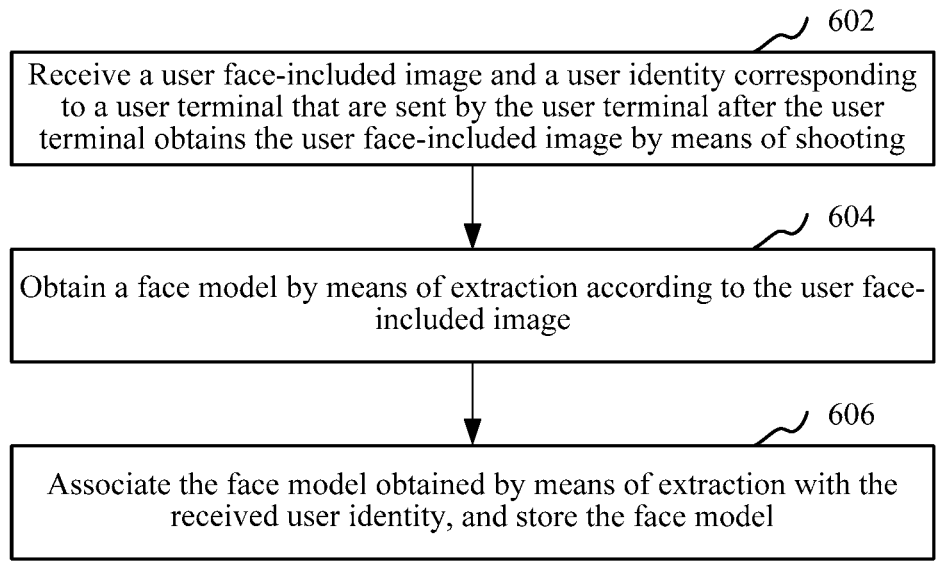
FIG. 6 is a schematic flowchart of steps of associating a user identity with a face model according to some embodiments of this application.

As shown in FIG. 6, in some embodiments of this application, before step 502, the method further includes a step of associating the user identity with the face model, which specifically includes the following steps:

Step 602: Receive a user face-included image and a user identity corresponding to a user terminal that are sent by the user terminal after the user terminal obtains the user face-included image by means of shooting.

Specifically, the user terminal obtains a shooting instruction, shoots a user face-included image according to the shooting instruction, and sends the user face-included image to an Internet-of-Things open platform together with a user identity used by the user terminal during login, and the Internet-of-Things open platform receives the user face-included image and the user identity. The shooting instruction may be triggered in manners such as pressing a physical key, a touch control operation or sound control. The user face-included image is an image including the face of a user having a user terminal. There may be a plurality of user face-included images, and the number may be specified in advance or determined by the user. The plurality of user face-included images may be face-included images of a user at different angles.

Step 604: Obtain the face model by means of extraction according to the user face-included image.

Specifically, the Internet-of-Things open platform may extract features from the user face-included image to form the face model, and the extracted feature may use a texture feature, a shape feature, a bag-of-visual-words feature, or the like. If there is a plurality of user face-included images, the features are separately extracted from each user face-included image to form the face model.

Step 606: Associate the face model obtained by means of extraction with the received user identity, and store the face model.

Specifically, the Internet-of-Things open platform associates the face model with the user identity, and records an association relationship between the face model and the user identity, and stores the face model. If there is a plurality of user face-included images, all face models obtained by means of extraction from the user face-included images are associated with the received user identity.

In the embodiments, the user may actively shoot a user face-included image and upload the user face-included image by using the user terminal, and construct a face model and associate the face model with the user identity, to expand a face model library. Subsequently, after receiving the face-included image collected and uploaded by the electronic mirror, the Internet-of-Things open platform can accurately push, to the user terminal, a notification that the face-included image has been collected.

Figure 7:
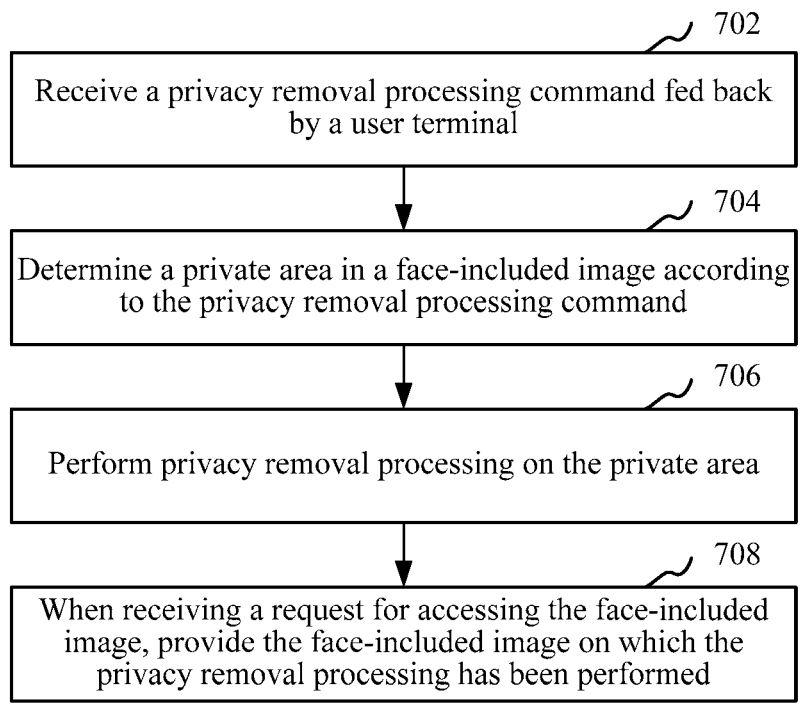
FIG. 7 is a schematic flowchart of steps of performing privacy removal processing on a face-included image according to some embodiments of this application.

As shown in FIG. 7, in some embodiments of this application, after step 508, the image processing method for an electronic mirror further includes a step of performing privacy removal processing on the face-included image, which specifically includes the following steps:

Step 702: Receive a privacy removal processing command fed back by the user terminal.

Specifically, after receiving the notification, the user terminal displays, according to the notification, a prompt that the electronic mirror has collected the face-included image of the user. The user terminal may specifically display the face-included image or a thumbnail of the face-included image, and display the recognition information of the electronic mirror that has collected the face-included image.

The user terminal may display a tool bar according to the notification, display a face-included image processing icon in the tool bar, detect an operation instruction for the face-included image processing icon, generate a processing command for the face-included image according to the operation instruction, and send the processing command to the Internet-of-Things open platform, and the Internet-of-Things open platform responds to the processing command. The processing command includes a privacy removal processing command. The privacy removal processing command is a command used for processing the face-included image to remove or cover private or sensitive areas in the face-included image.

Step 704: Determine a private area in the face-included image according to the privacy removal processing command.

The private area is an area that is in the face-included image and in which privacy information exists and needs to be reduced or removed. The private area is, for example, an area in which a face is located, an area in which particular text is located, or other areas in the face-included image that is not suitable to be exposed.

In some embodiments of this application, the privacy removal processing command may specify the location of the private area in the face-included image, so that the Internet-of-Things open platform may determine the private area in the face-included image according to location information in the privacy removal processing command. For example, when displaying the face-included image, the user terminal may select, according to an operation instruction of the user, a private area on which privacy removal processing needs to be performed, so as to add the location information of the private area to the privacy removal processing command. The location information may be represented by using horizontal and longitudinal coordinates.

In some embodiments of this application, the Internet-of-Things open platform may position the private area in the face-included image according to the privacy removal processing command in a mode recognition manner. Specifically, the Internet-of-Things open platform may train a classifier configured to classify a private area from a non-private area in the face-included image, so as to make a response after receiving the privacy removal processing command, and position the private area in the face-included image by using the classifier.

Step 706: Perform privacy removal processing on the private area.

Privacy removal processing is to reduce or remove the privacy information in the private area. Specifically, Gaussian blur processing with a blurring radius greater than a preset value may be performed on the private area, or a preset image or a random image may be covered on the private area, or random sequencing may be performed on the private area after the private area is divided.

Step 708: When receiving a request for accessing the face-included image, provide the face-included image on which the privacy removal processing has been performed.

Specifically, when receiving a request that is for accessing the face-included image and that is triggered by any user, the Internet-of-Things open platform may feedback, according to the request, the face-included image on which the privacy removal processing has been performed. In some embodiments of this application, when receiving a request that is for accessing the face-included image and that is triggered by the public of non-associated user identities, the Internet-of-Things open platform may provide the face-included image on which the privacy removal processing has been performed; and when receiving a request that is for accessing the face-included image and that is triggered by the public of associated user identities, the Internet-of-Things open platform may provide the face-included image on which the privacy removal processing has not been performed. The Internet-of-Things open platform may further perform an operation specified by an authorization request, on the face-included image on which the privacy removal processing has been performed, or actively push the face-included image on which the privacy removal processing has been performed as a recommendable resource.

In the embodiments, the electronic mirror is used as a public device and generally placed in public places. The face-included image collected by the electronic mirror generally also has privacy information, and performing privacy removal processing on the face-included image can avoid leakage of user privacy and ensure the security of using the public device by the user. In addition, by means of a notification, sent to the user terminal, that the electronic mirror has collected the face-included image, the user can learn of in real time that his face has been collected by the electronic mirror, and the user can actively perform privacy removal processing on the face-included image, to avoid unexpected leakage of his privacy. Moreover, because the privacy information of the face-included image on which the privacy removal processing has been performed is reduced or removed, the face-included image can be spread in public, thereby facilitating image-based interaction.

In some embodiments of this application, as shown in FIG. 5, after step 508, the image processing method for an electronic mirror further includes step 510 of receiving an image editing command not for privacy removal fed back by the user terminal, and editing the face-included image according to the image editing command not for privacy removal.

The image editing command not for privacy removal is an image editing command different from the privacy removal processing command, and is used for controlling the Internet-of-Things open platform to perform image editing other than privacy removal processing on a face image, such as compressing an image, modifying the size, adding a preset image decoration element, or changing color matching of an image. The preset image decoration element is, for example, an image frame and a virtual dressing appearance.

In the embodiments, the user may further edit the face-included image that is related to the face of the user and that is collected by the electronic mirror, so that the face-included image that is collected by the electronic mirror and that is stored by the Internet-of-Things open platform meets a use requirement of the user. When learning of in real time that his face has been collected by the electronic mirror, the user may process the face-included image in time, so as to avoid incorrect use of the face-included image in a manner not acceptable by the user to which the face belongs.

In some embodiments of this application, as shown in FIG. 5, after step 508, the image processing method for an electronic mirror further includes step 512 of receiving an image publishing-scope configuration command fed back by the user terminal, and configuring a publishing scope of the face-included image according to the image publishing-scope configuration command.

Specifically, the user may trigger the image publishing-scope configuration command by using the user terminal, to actively configure the publishing scope of the face-included image, such as "only visible to the user himself", "only visible to friends", or "visible to the public". In the embodiments, the user may configure the publishing scope of the face-included image related to the face of the user, to avoid malicious leakage of his privacy.

In some embodiments of this application, as shown in FIG. 5, after step 508, the image processing method for an electronic mirror further includes step 514 of receiving an image sharing command fed back by the user terminal, and sharing the face-included image according to the image sharing command.

Specifically, the Internet-of-Things open platform may extract an identifier of a user that needs to receive a to-be-shared face-included image, and share the face-included image according to the extracted identifier of the user. The Internet-of-Things open platform may also share the face-included image on a user homepage corresponding to the user identity. In the embodiments, the user can actively share the face-included image collected by the electronic mirror, thereby increasing user interaction methods.

In some embodiments of this application, before the Internet-of-Things open platform performs processing on the face-included image according to the privacy removal processing command, the image editing command not for privacy removal, the image publishing-scope configuration command, or the image sharing command, the Internet-of-Things open platform may perform corresponding processing on the face-included image after completing a payment operation according to a payment request initiated by the user terminal.

Figure 8:
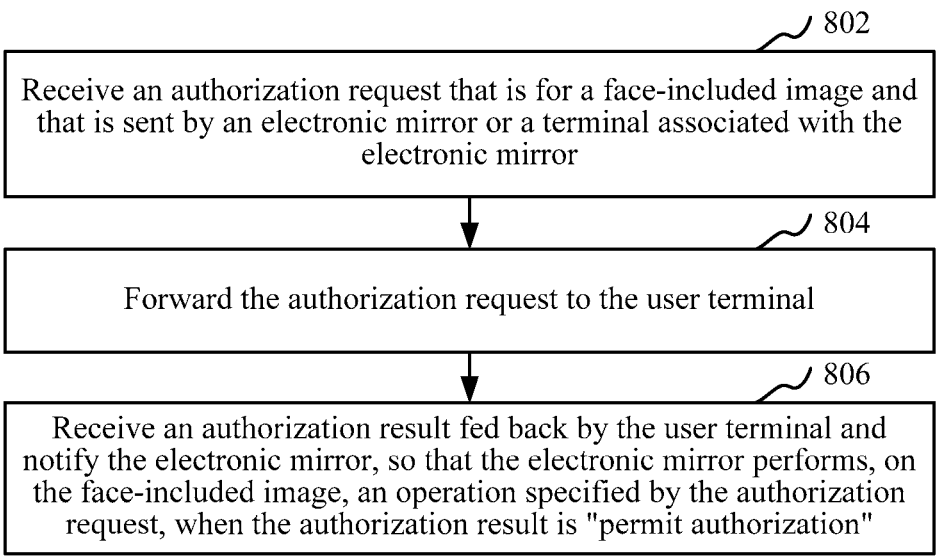
FIG. 8 is a schematic flowchart of steps of performing authorization in response to an authorization request of an electronic mirror according to some embodiments of this application.

As shown in FIG. 8, in some embodiments of this application, the image processing method for an electronic mirror further includes a step of performing authorization in response to an authorization request of the electronic mirror, which specifically includes the following steps:

Step 802: Receive an authorization request that is for a face-included image and that is sent by an electronic mirror or a terminal associated with the electronic mirror.

Specifically, the owner of the electronic mirror may initiate, to an Internet-of-Things open platform by using the electronic mirror, an authorization request for the face-included image. The authorization request is used for requesting the owner of the face to which the face-included image belongs to perform authorization on the owner of the electronic mirror on a further operation for the face-included image. The owner of the electronic mirror is a user who associates the electronic mirror with his user identity in advance by means of a binding operation. The terminal associated with the electronic mirror a terminal with which the owner of the electronic mirror performs log-in.

Step 804: Forward the authorization request to the user terminal.

Step 806: Receive an authorization result fed back by the user terminal and notify the electronic mirror, so that the electronic mirror performs, on the face-included image, an operation specified by the authorization request, when the authorization result is "permit authorization".

Specifically, after receiving the authorization request, the user terminal may provide options of "permit authorization" and "reject authorization", and select an option according to a user selection instruction, so as to generate, according to the selected option, an authorization result indicating "permit authorization" or "reject authorization", and send the authorization result to the Internet-of-Things open platform. The Internet-of-Things open platform sends the authorization result to the electronic mirror. If receiving an authorization result indicating "permit authorization", the electronic mirror performs, on the face-included image, an operation specified by the authorization request. For example, the electronic mirror locally performs, on the face-included image, an operation specified by the authorization request, or the electronic mirror performs, on the face-included image by using a network, an operation specified by the authorization request. If receiving an authorization result indicating "reject authorization", the electronic mirror may prompt to reject to perform authorization and may further delete the face-included image locally stored by the electronic mirror.

In some embodiments of this application, after receiving an authorization result indicating "permit authorization", the Internet-of-Things open platform may further subtract, according to the authorization result, a first value from a first value account corresponding to the owner of the electronic mirror, and add a second value to a second value account corresponding to the associated user identity. The second value is less than or equal to the first value, and a difference between the first value and the second value may be added to a preset third account. The first value and the second value may be specified by the authorization request or preset by the Internet-of-Things open platform. The first value account and the second value account may be an account in a bank, an account on a third-party payment platform, or a bonus point account.

In the embodiments, after collecting the face-included image, the electronic mirror may request the user of the face to which the face-included image belongs to perform authorization on the owner of the electronic mirror on a further operation for the face-included image. In this way, although the electronic mirror is a public device, a problem of user privacy leakage resulted from arbitrary processing of the face-included image will not be caused, thereby enhancing the security of the interaction method based on the face-included image of the electronic mirror.

Figure 9:
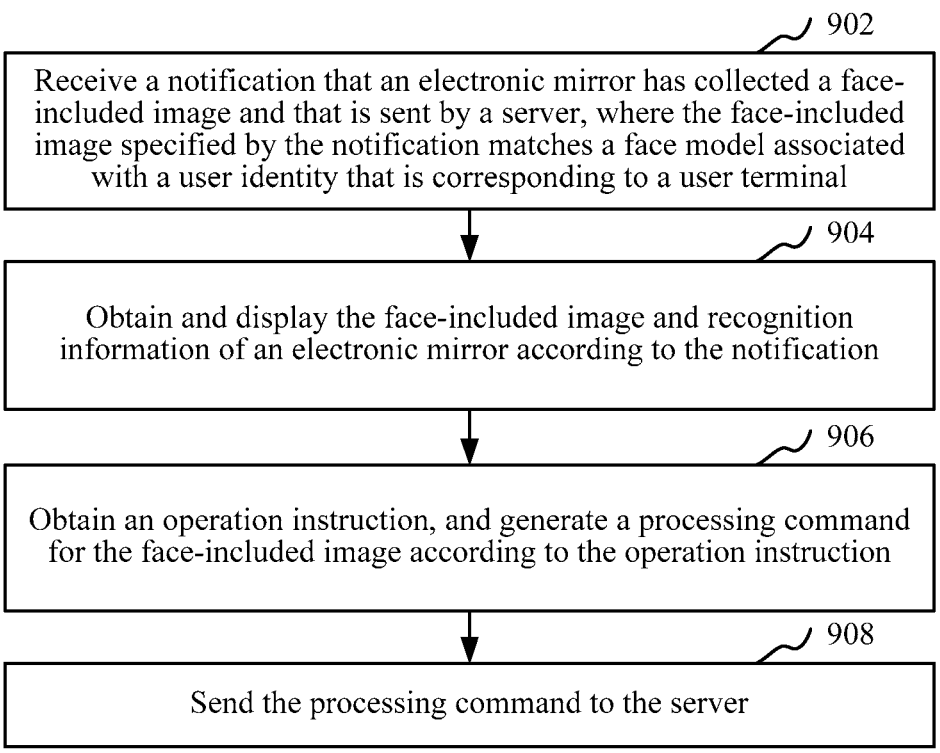
FIG. 9 is a schematic flowchart of an image processing method for an electronic mirror according to some embodiments of this application.

As shown in FIG. 9, in some embodiments, an image processing method for an electronic mirror is further provided. The embodiments are described by using an example in which the method is applied to the user terminal 106 shown in FIG. 1 and FIG. 4. The method specifically includes the following steps:

Step 902: Receive a notification that an electronic mirror has collected a face-included image and that is sent by a server, where the face-included image specified by the notification matches a face model associated with a user identity that is corresponding to the user terminal 106.

Specifically, the server such as an Internet-of-Things open platform may receive a face-included image collected and uploaded by the electronic mirror, searches for a face model matching the face-included image, obtain a user identity associated with the matched face model, and send, to a user terminal corresponding to the associated user identity, a notification that the electronic mirror has collected the face-included image.

The electronic mirror is a mirror, such as an electronic dressing mirror or an electronic makeup mirror, which can collect an image and can send the collected image by using a network. The face-included image is an image including a face. The face-included image may further include other parts of a human body. For example, the face-included image may be a half-length photo including a face or a full-length photo including a face. The electronic mirror may be configured as a public device, which can collect an image according to operation instructions of the public and provide the image for the Internet-of-Things open platform. However, a permission of reading data from the Internet-of-Things open platform or modifying data in the Internet-of-Things open platform may be limited.

The electronic mirror may obtain a control instruction of a user, so as to collect the face-included image according to the control instruction. The control instruction may be triggered in manners such as pressing a physical key, a touch control operation or sound control. The electronic mirror may also collect an image in real time and perform face detection on the collected image, and if detecting a face, upload the currently detected face to the Internet-of-Things open platform as the face-included image. The electronic mirror may also detect a specified body movement by using the image collected in real time, so as to collect the face-included image when detecting the specified body movement. The specified body movement is, for example, blinking eyes, opening and closing the mouth, raising a hand, or nodding the head.

In some embodiments of this application, the electronic mirror may further edit the collected face-included image and then upload the edited face-included image to the Internet-of-Things open platform. For example, the electronic mirror may provide various virtual dressing appearance options, select a virtual dressing appearance according to a user operation, and mix the selected virtual dressing appearance with the face-included image.

The face model is associated with a user identity, and is data used for describing facial features of a user corresponding to the user identity. The Internet-of-Things open platform may obtain in advance user face-included images corresponding to the user identity, extract features from the user face-included images to form face models, associate the face models with the user identity, and store the face models. The extracted feature may be a texture feature, a shape feature, a bag-of-visual-words feature, or the like. The user face-included image may be selected from a network album of the user, or may be actively uploaded by the user after the user is notified, or may be pulled out from a third-party identity authentication platform.

In some embodiments of this application, the Internet-of-Things open platform may perform extraction on the face-included image to form a face model, calculate the similarity between the face model formed by means of extraction and each of the pre-stored face models, and then determine a face model having the highest similarity to be the face model matching the face-included image. The similarity may use the Euclidean distance or the Mahalanobis Distance.

In some embodiments of this application, if the similarity is lower than a preset minimum threshold, it is determined that no face model matching the face-included image is found. In this case, the face-included image may be directly deleted, or a permission of accessing the face-included image may be limited, or the electronic mirror is instructed to delete the corresponding face-included image stored in the electronic mirror, so that malicious obtaining of the face-included image can be avoided as much as possible when a user to which the face-included image belongs cannot be determined.

The Internet-of-Things open platform associates a user identity of a user with a face model of the user in advance. Each user identity may be associated with a plurality of face models of the same user. After determining the face model matching the face-included image, the Internet-of-Things open platform obtains the user identity that is associated with the face model matching the face-included image. The user identity is used for uniquely identifying the corresponding user and may include at least one of numbers, letters, and special symbols.

The Internet-of-Things open platform may obtain a network address of the user terminal corresponding to the associated user identity, so as to send a notification to the user terminal according to the network address. The notification carries an image identifier of the face-included image and recognition information of the electronic mirror, and may further carry the face-included image or a thumbnail of the face-included image.

By means of the image identifier, the face-included image or the thumbnail that are carried in the notification, it can be determined that the face-included image has been collected, and a specific electronic mirror that has collected the face-included image can be recognized by using the recognition information of the electronic mirror. The recognition information is used for recognizing a corresponding electronic mirror, and is, for example, the number, name, location information, and/or owner information of the electronic mirror.

In some embodiments of this application, there may be a plurality of faces in the face-included image, correspondingly, there may be a plurality of matched face models and a plurality of associated user identities, and there may be a plurality of user terminals that finally receive the face-included image.

Step 904: Obtain and display the face-included image and recognition information (an identifier) of the electronic mirror according to the notification.

Specifically, the user terminal may extract the face-included image and the recognition information of the electronic mirror from the notification, and may further pull out the face-included image and the recognition information of the electronic mirror from the Internet-of-Things open platform according to the notification. The user terminal displays the obtained face-included image or the thumbnail of the face-included image, and the recognition information of the electronic mirror, so as to help the user to identify the face-included image and a scenario of collecting the face-included image.

Step 906: Obtain an operation instruction, and generate a processing command for the face-included image according to the operation instruction.

Specifically, the user terminal obtains an operation instruction for the displayed face-included image, so as to generate a corresponding processing command according to the operation instruction. The operation instruction may be triggered in manners such as pressing a physical key, a touch control operation or sound control.

Step 908: Send the processing command to the server.

Specifically, the user terminal sends a processing command to the server such as the Internet-of-Things open platform, so that the server performs corresponding processing on the face-included image according to the processing command.

In some embodiments of this application, the processing command includes: at least one of a privacy removal processing command, an image editing command not for privacy removal, an image publishing-scope configuration command, an image deleting command and an image sharing command.

If the processing command is a privacy removal processing command, the Internet-of-Things open platform may determine a private area in the face-included image according to the privacy removal processing command to perform privacy removal processing on the private area, and when receiving a request for accessing the face-included image, provide the face-included image on which the privacy removal processing has been performed.

If the processing command is an image editing command not for privacy removal, the Internet-of-Things open platform edits the face-included image according to the image editing command not for privacy removal. If the processing command is an image publishing-scope configuration command, the Internet-of-Things open platform configures a publishing scope of the face-included image according to the image publishing-scope configuration command. If the processing command is an image sharing command, the Internet-of-Things open platform shares the face-included image according to the image sharing command.

According to the image processing method for an electronic mirror, after the face-included image collected by the electronic mirror is obtained, the face-included image can be automatically recognized to determine a user to which the face-included image belongs, so that the face-included image is sent to the corresponding user. The electronic mirror is no longer limited to a use scenario, and after the electronic mirror has collected the face-included image, the user can receive a corresponding notification by using a user terminal, so that application scenarios of the electronic mirror are extended, and the resources of the electronic mirror are fully, conveniently, and easily used. Moreover, when learning of in real time that his face has been collected by the electronic mirror, the user may process the face-included image in time, so as to avoid incorrect use of the face-included image in a manner not acceptable by the user to which the face belongs.

Figure 10:
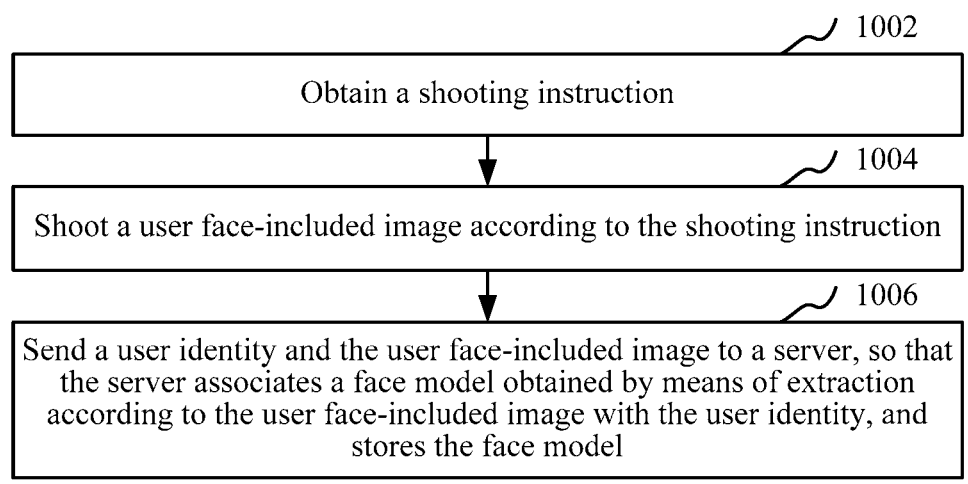
FIG. 10 is a schematic flowchart of steps of shooting a user face-included image to construct a face model according to some embodiments of this application.

As shown in FIG. 10, in some embodiments of this application, after step 902, the image processing method for an electronic mirror further includes a step of shooting a user face-included image to construct a face model, which specifically includes the following steps:

Step 1002: Obtain a shooting instruction.

Specifically, the shooting instruction is used for triggering an operation of shooting a user face-included image, where the shooting instruction may be triggered in such manners as pressing a physical key, a touch control operation or sound control.

Step 1004: Shoot a user face-included image according to the shooting instruction.

Step 1006: Send a user identity and the user face-included image to a server, so that the server associates a face model obtained by means of extraction according to the user face-included image with the user identity, and stores the face model.

The user face-included image is an image including the face of a user having a user terminal. There may be a plurality of user face-included images, and the number may be specified in advance or determined by the user. The plurality of user face-included images may be face-included images of a user at different angles.

The Internet-of-Things open platform may extract features from the user face-included image to form the face model, and the extracted feature may use a texture feature, a shape feature, a bag-of-visual-words feature, or the like. If there is a plurality of user face-included images, the features are separately extracted from each user face-included image to form the face model.

The Internet-of-Things open platform associates the face model with the user identity, and records an association relationship between the face model and the user identity, and stores the face model. If there is a plurality of user face-included images, all face models obtained by means of extraction from the user face-included images are associated with the received user identity.

In the embodiments, the user may actively shoot a user face-included image and upload the user face-included image by using the user terminal, and construct a face model and associate the face model with the user identity, to expand a face model library. Subsequently, after receiving the face-included image collected and uploaded by the electronic mirror, the Internet-of-Things open platform can accurately push, to the user terminal, a notification that the face-included image has been collected.

Figure 11:
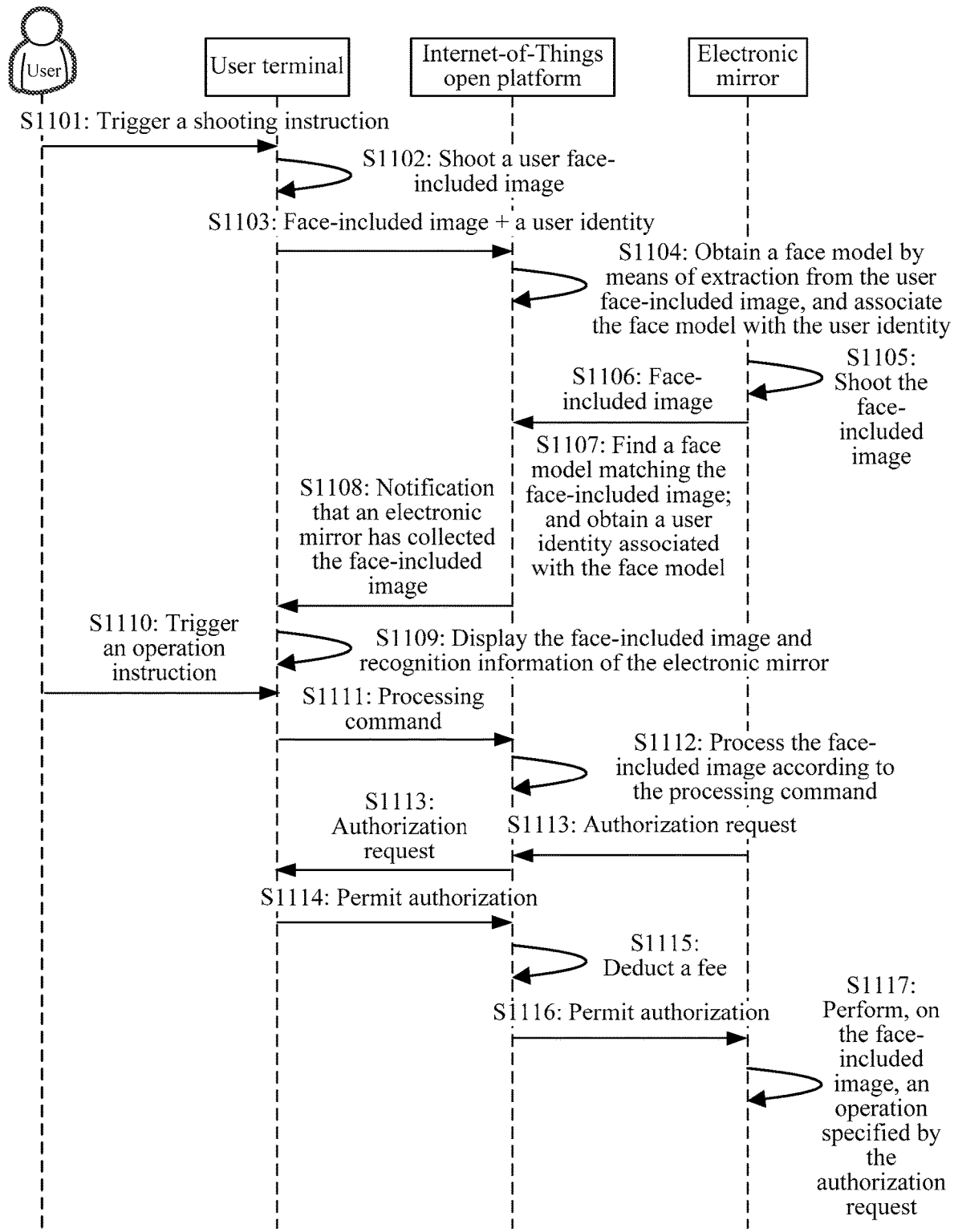
FIG. 11 is a sequence diagram of interacting, by a user with an Internet-of-Things open platform and an electronic mirror by using a user terminal according to some specific application scenarios of this application.
Figure 12:
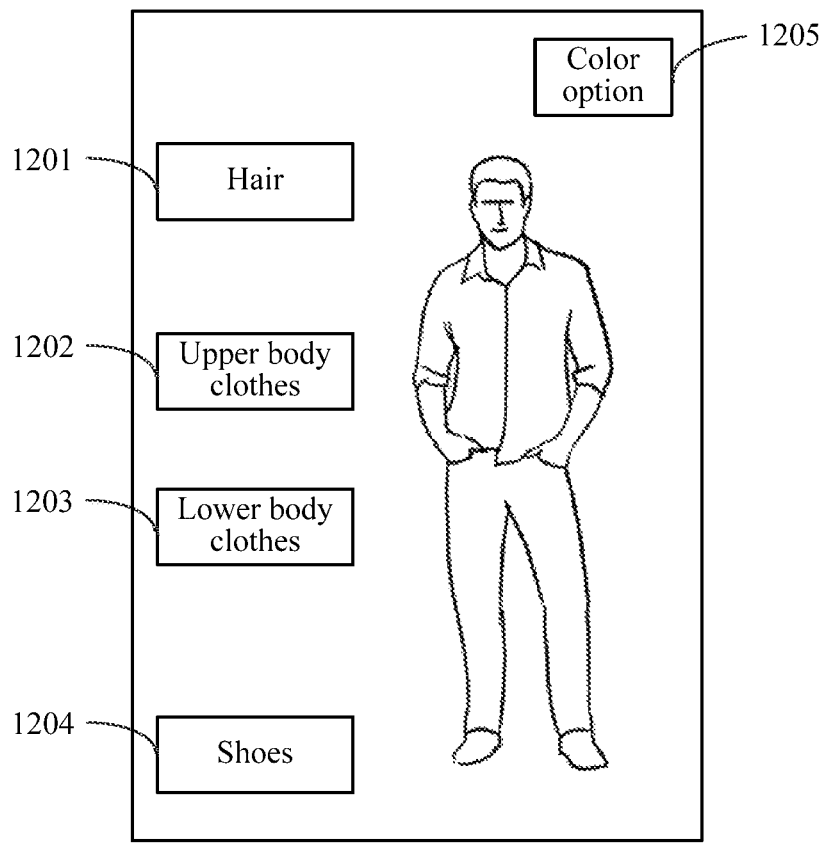
FIG. 12 is a schematic diagram of an interface when an electronic mirror collects a face-included image according to some embodiments of this application.

The principle of the image processing method for an electronic mirror is described below by using a specific application scenario. Referring to FIG. 11, a user may operate a user terminal to trigger a shooting instruction (step S1101), and the user terminal shoots a user face-included image (step S1102). The user terminal sends, to an Internet-of-Things open platform, the user face-included image and a user identity used by the user terminal during login (step S1103), and the Internet-of-Things open platform obtains a face model by means of extraction from the user face-included image, and associates the face model with the user identity (step S1104). Referring to FIG. 12, the user may virtually try clothes on in front of the electronic mirror, choose a virtual dressing appearance, such as hair 1201, upper body clothes 1202, lower body clothes 1203, shoes 1204, and the like, and may further choose the color of the virtual dressing appearance, as marked by 1205 in FIG. 12. The electronic mirror collects the face-included image (step S1105), mixes the virtual dressing appearance with the face-included image, and then sends the face-included image to the Internet-of-Things open platform (step S1106). The Internet-of-Things open platform finds a face model matching the face-included image (step S1107), and obtains a user identity associated with the face model, so as to send, to the user terminal corresponding to the user identity, a notification that the electronic mirror has collected the face-included image (step S1108).

Figure 13:
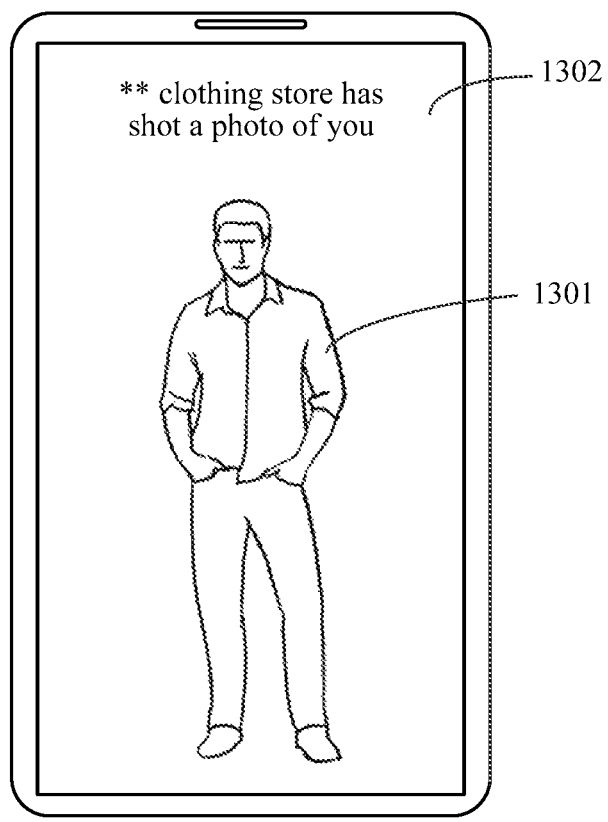
FIG. 13 is a schematic diagram of an interface that is of a user terminal and that displays, according to a notification, a face-included image and recognition information of an electronic mirror according to some embodiments of this application.

Further, after receiving the notification, the user terminal may display the face-included image 1301 and recognition information 1302 of the electronic mirror according to the notification (step S1109), which is specifically as shown in FIG. 13. Then, the user triggers an operation instruction (step S1110), and the user terminal generates a processing command for the face-included image according to the operation instruction and sends the processing command to the Internet-of-Things open platform (step S1111). The Internet-of-Things open platform processes the face-included image according to the processing command (step S1112), such as performing privacy removal processing, performing image editing not for privacy removal processing, configuring a publishing scope and sharing the image. The electronic mirror may further send an authorization request to the user terminal by using the Internet-of-Things open platform (step S1113), and the user terminal returns an authorization result to the Internet-of-Things open platform (step S1114). If the authorization result is "permit authorization", the Internet-of-Things open platform deducts a corresponding fee from an account of the electronic mirror (step S1115), and feeds back the authorization result "permit authorization" to the electronic mirror (step S1116), and the electronic mirror performs a further operation on the face-included image according to the authorization result (step S1117).

Figure 14:
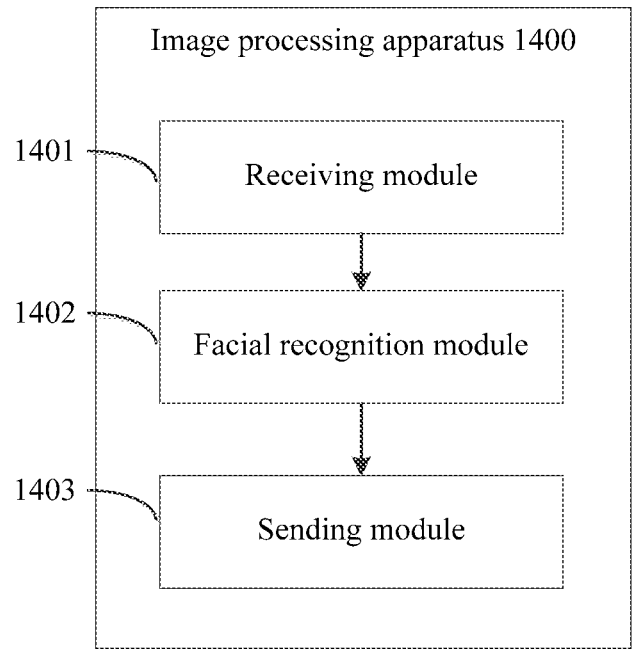
FIG. 14 is a structural block diagram of an image processing apparatus for an electronic mirror according to some embodiments of this application.

As shown in FIG. 14, in some embodiments of this application, an image processing apparatus 1400 for an electronic mirror is provided, including a receiving module 1401, a facial recognition module 1402, and a sending module 1403.

The receiving module 1401 is configured to receive a face-included image collected and uploaded by an electronic mirror.

The facial recognition module 1402 is configured to search for a face model matching the face-included image.

The sending module 1403 is configured to: obtain a user identity associated with the matched face model; and send, to a user terminal corresponding to the associated user identity, a notification that the electronic mirror has collected the face-included image.

After obtaining the face-included image collected by the electronic mirror, the image processing apparatus 1400 for an electronic mirror can automatically recognize the face-included image to determine a user to which the face-included image belongs, so as to send the face-included image to the corresponding user. The electronic mirror is no longer limited to a use scenario, and after the electronic mirror has collected the face-included image, the user can receive a corresponding notification by using a user terminal, so that application scenarios of the electronic mirror are extended, and the resources of the electronic mirror are fully, conveniently, and easily used.

Figure 15:
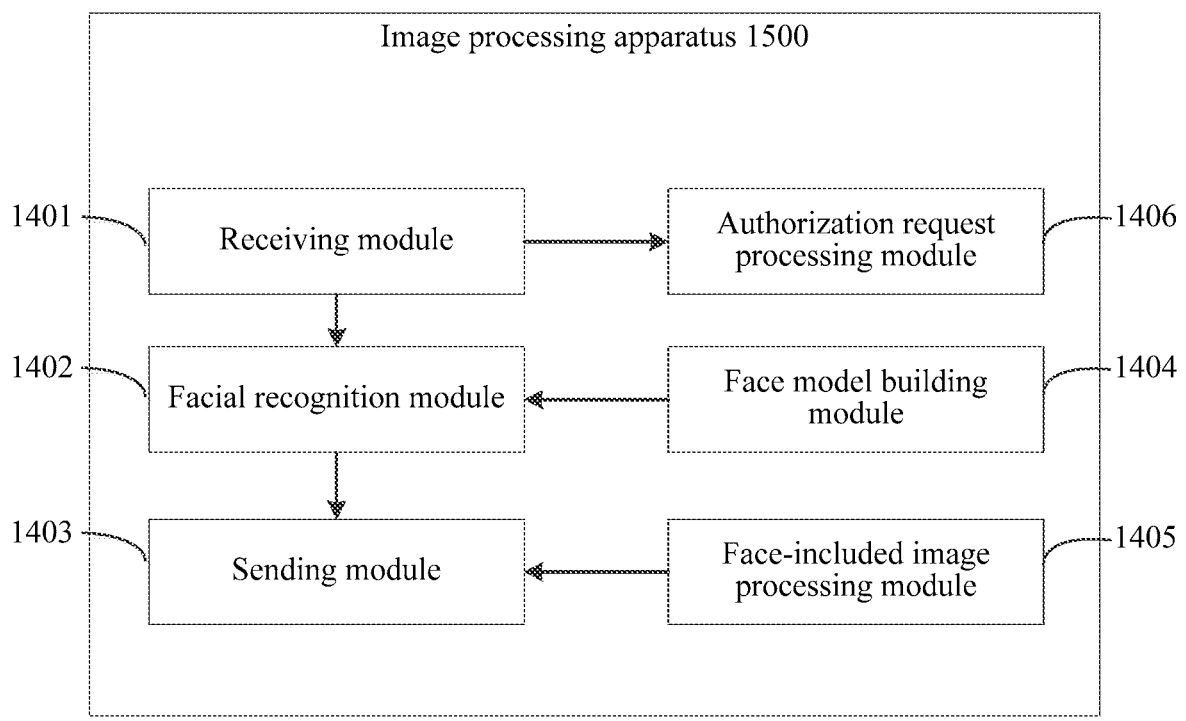
FIG. 15 is another structural block diagram of an image processing apparatus for an electronic mirror according to some embodiments of this application.

As shown in FIG. 15, in some embodiments of this application, in addition to a receiving module 1401, a facial recognition module 1402, and a sending module 1403, an image processing apparatus 1500 for an electronic mirror shown in FIG. 15 further includes: a face model construction module 1404, configured to: receive a user face-included image and a user identity corresponding to a user terminal that are sent by the user terminal after the user terminal shoots a user face-included image; obtain a face model by means of extraction according to the user face-included image; and associate the obtained face model by means of extraction with the received user identity, and store the face model.

In the embodiments, the user may actively shoot a user face-included image and upload the user face-included image by using the user terminal, and construct a face model and associate the face model with the user identity, to expand a face model library. Subsequently, after receiving the face-included image collected and uploaded by the electronic mirror, the Internet-of-Things open platform can accurately push, to the user terminal, a notification that the face-included image has been collected.

In some embodiments of this application, the image processing apparatus 1400 for an electronic mirror further includes a face-included image processing module 1405, configured to: receive a privacy removal processing command fed back by the user terminal; determine a private area in the face-included image according to the privacy removal processing command; perform privacy removal processing on the private area; and when receiving a request for accessing the face-included image, provide the face-included image on which the privacy removal processing has been performed.

In the embodiments, the electronic mirror is used as a public device and generally placed in public places. The face-included image collected by the electronic mirror generally also has privacy information, and performing privacy removal processing on the face-included image can avoid leakage of user privacy and ensure the security of using the public device by the user. In addition, by means of a notification, sent to the user terminal, that the electronic mirror has collected the face-included image, the user can learn of in real time that his face has been collected by the electronic mirror, and the user can actively perform privacy removal processing on the face-included image, to avoid unexpected leakage of his privacy. Moreover, because the privacy information of the face-included image on which the privacy removal processing has been performed is reduced or removed, the face-included image can be spread in public, thereby facilitating image-based interaction.

In some embodiments of this application, the face-included image processing module 1405 is further configured to: receive an image editing command not for privacy removal fed back by the user terminal, and edit the face-included image according to the image editing command not for privacy removal.

In some embodiments of this application, the face-included image processing module 1405 is further configured to: receive an image publishing-scope configuration command fed back by the user terminal, and configure a publishing scope of the face-included image according to the image publishing-scope configuration command.

In some embodiments of this application, the face-included image processing module 1405 is further configured to: receive an image sharing command fed back by the user terminal, and share the face-included image according to the image sharing command.

In some embodiments of this application, the image processing apparatus 1400 for an electronic mirror further includes an authorization request processing module 1406, configured to: receive an authorization request that is for a face-included image and that is sent by an electronic mirror or a terminal associated with the electronic mirror; forward the authorization request to the user terminal; and receive an authorization result fed back by the user terminal and notify the electronic mirror, so that the electronic mirror performs an operation specified by the authorization request on the face-included image when the authorization result is "permit authorization".

In the embodiments, after collecting the face-included image, the electronic mirror may request the user of the face to which the face-included image belongs to perform authorization on the owner of the electronic mirror on a further operation for the face-included image. In this way, although the electronic mirror is a public device, a problem of user privacy leakage resulted from arbitrary processing of the face-included image will not be caused, thereby enhancing the security of the interaction method based on the face-included image of the electronic mirror.

Figure 16:
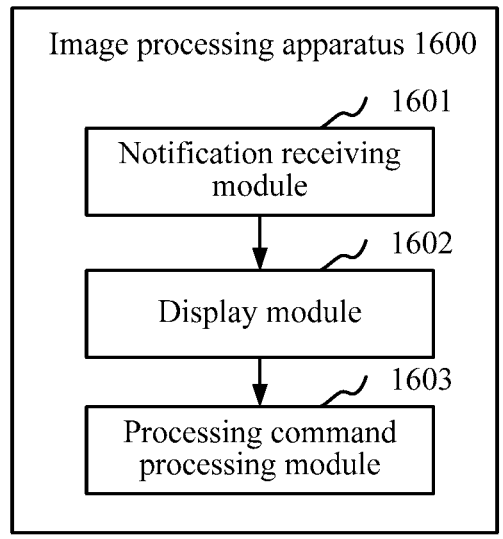
FIG. 16 is a structural block diagram of an image processing apparatus for an electronic mirror according to some embodiments of this application.

As shown in FIG. 16, in some embodiments of this application, an image processing apparatus 1600 for an electronic mirror is provided, including a notification receiving module 1601, a display module 1602, and a processing command processing module 1603.

The notification receiving module 1601 is configured to receive a notification that an electronic mirror has collected a face-included image and that is sent by a server, where the face-included image specified by the notification matches a face model associated with a user identity that is corresponding to the image processing apparatus 1600 for an electronic mirror.

The display module 1602 is configured to obtain and display the face-included image and recognition information of the electronic mirror according to the notification.

The processing command processing module 1603 is configured to: obtain an operation instruction, generate a processing command for the face-included image according to the operation instruction; and send the processing command to the server.

After obtaining the face-included image collected by the electronic mirror, the image processing apparatus 1600 for an electronic mirror can automatically recognize the face-included image to determine a user to which the face-included image belongs, so as to send the face-included image to the corresponding user. The electronic mirror is no longer limited to a use scenario, and after the electronic mirror has collected the face-included image, the user can receive a corresponding notification by using a user terminal, so that application scenarios of the electronic mirror are extended, and the resources of the electronic mirror are fully, conveniently, and easily used. Moreover, when learning of in real time that his face has been collected by the electronic mirror, the user may process the face-included image in time, so as to avoid incorrect use of the face-included image in a manner not acceptable by the user to which the face belongs.

Figure 17:
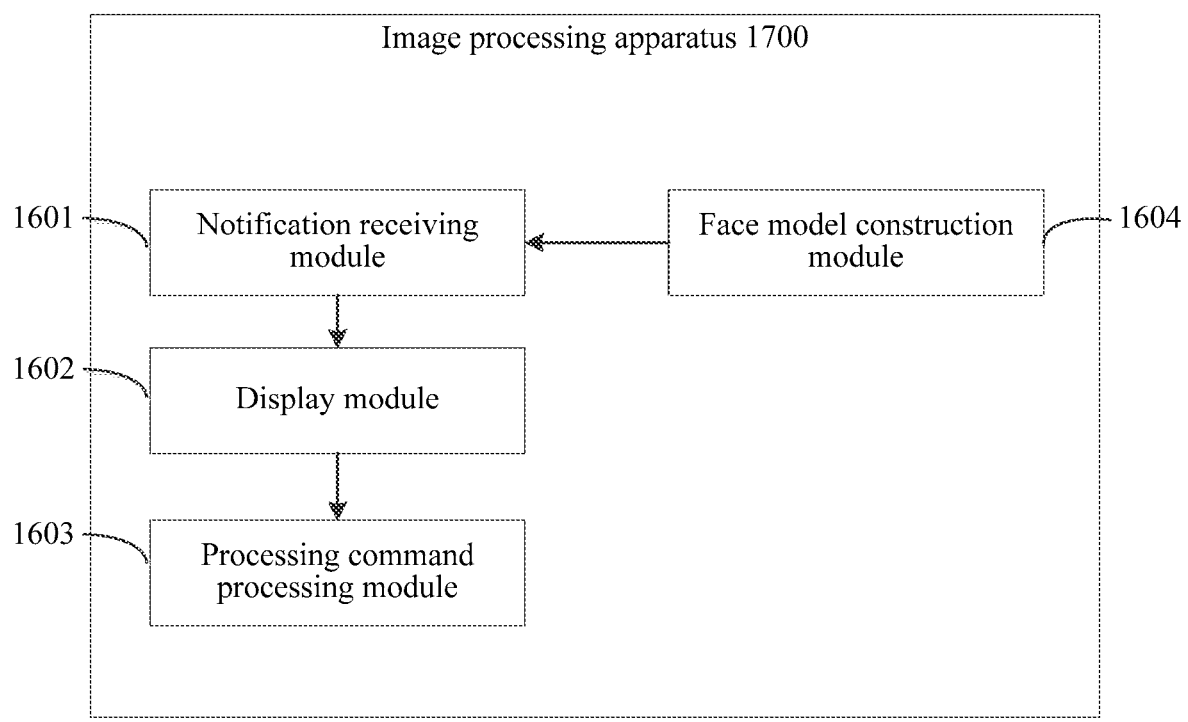
FIG. 17 is another structural block diagram of an image processing apparatus for an electronic mirror according to some embodiments of this application.

As shown in FIG. 17, in some embodiments of this application, in addition to the notification receiving module 1601, the display module 1602, and the processing command processing module 1603, the image processing apparatus 1700 for an electronic mirror shown in FIG. 17 further includes a face model construction module 1604, configured to: obtain a shooting instruction; shoot a user face-included image according to the shooting instruction; and send a user identity and a user face-included image to a server, so that the server associates a face model obtained by means of extraction according to the user face-included image with the user identity, and stores the face model.

In the embodiments, the user may actively shoot a user face-included image and upload the user face-included image by using the user terminal, and construct a face model and associate the face model with the user identity, to expand a face model library. Subsequently, after receiving the face-included image collected and uploaded by the electronic mirror, the Internet-of-Things open platform can accurately push, to the user terminal, a notification that the face-included image has been collected.

In some embodiments of this application, the processing command includes: at least one of a privacy removal processing command, an image editing command not for privacy removal, an image publishing-scope configuration command, an image deleting command and an image sharing command. The image deleting command may trigger the server to delete the face-included image specified by the image deleting command on the server.

A person of ordinary skill in the art can understand that all or some of the procedures of the methods in the foregoing embodiments may be implemented by a computer program by instructing relevant hardware. The computer program may be stored in a computer readable storage medium. When the program runs, the procedures of the methods in the foregoing embodiments are performed. The storage medium may be a non-volatile storage medium such as a magnetic disk, an optical disc, or a read-only memory (ROM), or may be a random access memory (RAM) or the like.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The above embodiments only express several implementation manners of the present disclosure, which are described specifically and in detail, and therefore cannot be construed as a limitation to the patent scope of the present disclosure. It should be noted that a person of ordinary skill in the art may further make some variations and improvements without departing from the concept of the present disclosure, and the variations and improvements belong to the protection scope of the present disclosure. Therefore, the protection scope of the present disclosure should be subject to the protection scope of the appended claims.

What is claimed is:

1. A method for processing an electronic mirror image, comprising:
    receiving, at an information processing apparatus, a first face-included image of a user from an electronic mirror;

determining, by processing circuitry of the information processing apparatus, a face model that matches the first face-included image;

obtaining, by the processing circuitry of the information processing apparatus, a user identity associated with the matched face model;

sending a notification to a terminal of the user corresponding to the associated user identity, the notification indicating the first face-included image has been obtained at the electronic mirror;

sending a request for an authorization to perform an operation on the first face-included image to the terminal of the user; and providing a credit to an account of the user in response to the authorization being received from the terminal of the user.

2. The method according to claim 1, further comprising:
before the receiving the first face-included image from the electronic mirror, receiving a second face-included image associated with the user identity;
extracting features from the received second face-included image to form the face model associated with the user identity; and
storing the face model associated with the user identity.

3. The method according to claim 1, further comprising:
receiving a command from the terminal of the user corresponding to the associated user identity; and
processing the first face-included image according to the received command.

4. The method according to claim 3, wherein the received command includes one of:
a privacy removal processing command indicating a private area in the first face-included image, an image editing command, an image publishing-scope configuration command, an image deleting command, or an image sharing command.

5. The method according to claim 4, wherein
the received command includes the privacy removal processing command; and
the method further includes providing the first face-included image on which privacy removal processing has been performed in response to receiving a request for accessing the first face-included image from another user that is not associated with the matched face model.

6. The method according to claim 1, further comprising:
identifying a private area in the first face-included image; and
processing the identified private area to remove or cover the private area.

7. The method according to claim 1, further comprising:
receiving from the electronic mirror the request for the authorization to perform the operation on the first face-included image; and
receiving the authorization to perform the operation on the first face-included image from the terminal of the user corresponding to the associated user identity; and
providing the authorization to perform the operation on the first face-included image to the electronic mirror.

8. The method according to claim 7, wherein the providing the credit comprises:
after receiving the authorization to perform the operation on the first face-included image from the terminal of the user corresponding to the associated user identity, performing one of,
subtracting a first value from a first account corresponding to an owner of the electronic mirror, adding a second value to a second account corresponding to the associated user identity, or adding a difference between the first value and the second value to a third account, wherein the first, second, or third account is one of an account at a bank, an account at a third-party payment platform, or a bonus point account.

9. A non-transitory computer-readable medium storing a program executable by a processor to perform:
receiving, from a server at an information processing apparatus of a user, a notification that an electronic mirror has collected a first face-included image of the user;
obtaining and displaying the first face-included image and an identifier of the electronic mirror according to the notification to the user of the information processing apparatus;
receiving a request for an authorization to perform an operation on the first face-included image from the server; and
sending the authorization to the server, wherein
the server is configured to provide a credit to an account of the user in response to the authorization being sent by the terminal of the user.

10. The non-transitory computer-readable medium according to claim 9, wherein the program is executable by the processor to perform:
before the receiving the notification that the electronic mirror has collected the first face-included image from the server, capturing a second face-included image; and
transmitting the second face-included image and a user identity to the server, wherein the server generates a face model associated with the user identity according to the second face-included image.

11. The non-transitory computer-readable medium according to claim 9, wherein the program is executable by the processor to perform:
obtaining one or more operation instructions for processing the first face-included image;
generating a processing command for processing the first face-included image according to obtained one or more operation instructions; and
transmitting the processing command for processing the first face-included image to the server.

12. The non-transitory computer-readable medium according to claim 11, wherein the processing command includes one of:
a privacy removal processing command indicating a private area in the first face-included image, an image editing command, an image publishing-scope configuration command, an image deleting command, and an image sharing command.

13. The non-transitory computer-readable medium according to claim 9, wherein the program is executable by the processor to perform:
receiving the request for the authorization to perform the operation on the first face-included image from the electronic mirror via the server; and
providing the authorization to allow the electronic mirror to perform the operation on the first face-included image.

14. An apparatus for processing an electronic mirror image, comprising processing circuitry configured to:
receive a first face-included image of a user from an electronic mirror;
determine a face model that matches the first face-included image;

obtain a user identity associated with the matched face model;

send a notification to a terminal of the user corresponding to the associated user identity, the notification indicating the first face-included image has been obtained at the electronic mirror;

send a request for an authorization to perform an operation on the first face-included image to the terminal of the user; and provide a credit to an account of the user in response to the authorization being received from the terminal of the user.

15. The apparatus according to claim 14, wherein the processing circuitry is further configured to:

receive a second face-included image associated with the user identity from the terminal of the user corresponding to the associated user identity;

extract features from the received second face-included image to form the face model associated with the user identity; and store the face model associated with the user identity.

16. The apparatus according to claim 14, wherein the processing circuitry is further configured to:

receive a command from the terminal of the user corresponding to the associated user identity; and process the first face-included image according to the received command.

17. The apparatus according to claim 16, wherein the received command includes one of:

a privacy removal processing command indicating a private area in the first face-included image, an image editing command, an image publishing-scope configuration command, an image deleting command, or an image sharing command.

18. The apparatus according to claim 17, wherein the received command includes the privacy removal processing command; and the processing circuitry is further configured to provide the first face-included image on which privacy removal processing has been performed in response to receiving a request for accessing the first face-included image from another user that is not associated with the matched face model.

19. The apparatus according to claim 14, wherein the processing circuitry is further configured to:

identify a private area in the first face-included image; and process the identified private area to remove or cover the private area.

20. The apparatus according to claim 14, wherein the processing circuitry is further configured to:

receive from the electronic mirror the request for the authorization to perform the operation on the first face-included image;

receive the authorization to perform the operation on the first face-included image from the terminal of the user corresponding to the associated user identity; and provide the authorization to perform the operation on the first face-included image to the electronic mirror.

\* \* \* \* \*